(12) United States Patent
Okita et al.

(10) Patent No.: US 7,222,553 B2
(45) Date of Patent: May 29, 2007

(54) BALL SCREW APPARATUS (75) Inventors: Shigeru Okita, Gunma (JP); Tsutomu Ohkubo, Gunma (JP); Daisuke Maruyama, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/308,072

(22) Filed: Dec. 3, 2002

(65) Prior Publication Data
US 2003/0121348 A1 Jul. 3, 2003

(30) Foreign Application Priority Data
Dec. 4, 2001 (JP) ............ P. 2001-370589

(51) Int. Cl.
F16H 25/22 (2006.01)

(52) U.S. Cl. ............... 74/424.88; 74/424.82

(58) Field of Classification Search ............ 74/424.88, 74/424.82, 424.86
See application file for complete search history.

(56) References Cited

U.S. PATENT DOCUMENTS

| | | | |
|---|---|---|---|
| 4,761,820 A | 8/1988 | Frank et al. | |
| 6,347,558 B1 | 2/2002 | Miyaguchi et al. | |
| 6,415,676 B1 * | 7/2002 | Takagi et al. | 74/424.88 |
| 6,513,978 B2 * | 2/2003 | Shirai et al. | 384/45 |
| 6,561,054 B1 * | 5/2003 | Chiu et al. | 74/424.88 |
| 2002/0139209 A1 * | 10/2002 | Takagi et al. | 74/424.82 |
| 2003/0096668 A1 * | 5/2003 | Yoshida et al. | 474/39 |

FOREIGN PATENT DOCUMENTS

| | | |
|---|---|---|
| DE | 100 52 204 A1 | 7/2001 |
| JP | 2000-120825 A | 4/2000 |
| JP | 2000-199556 A | 7/2000 |
| JP | 2001-21018 A | 1/2001 |
| JP | 2001-41303 A | 2/2001 |
| JP | 2001-263446 A | 9/2001 |

* cited by examiner

Primary Examiner—William C. Joyce
(74) Attorney, Agent, or Firm—Sughrue Mion, PLLC (57) ABSTRACT The invention provides a ball screw apparatus which suppresses abrasion and damage by competition of balls, controls spaces between retaining pieces and balls, and prevents retaining pieces from falling, thereby enabling to more improve operating ability. The retaining pieces are positioned between the balls running in a ball rolling path, such that a sum total of the spaces between the retaining pieces and the balls is 50% or less of an outer diameter size of the retaining piece, and at the same time a contact angle between the retaining piece and the ball is 25° or above to 40° or below.

1 Claim, 6 Drawing Sheets

BALL SCREW APPARATUS

BACKGROUND OF THE INVENTION

The present invention relates to a ball screw apparatus, and in particular a technique effective for realizing more improvement of low noises, operationability and endurance.

Figure 8:
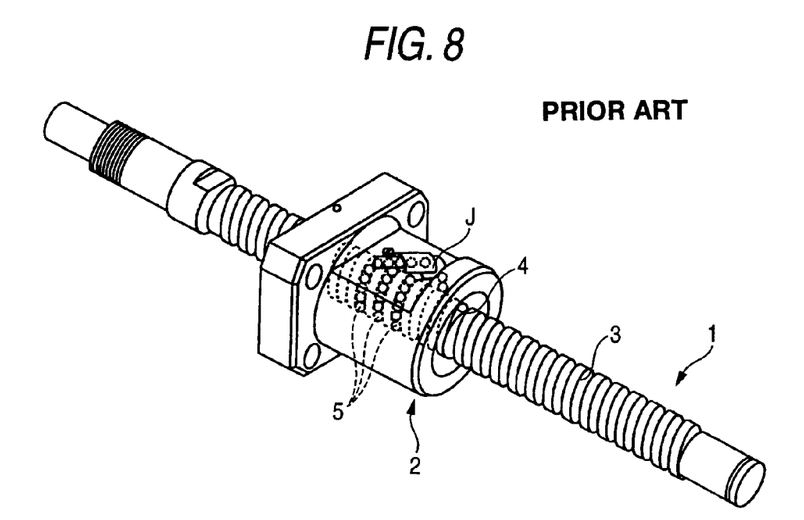
FIG. 8 is a perspective view showing one structural example of a conventional ball screw apparatus.
Figure 9:
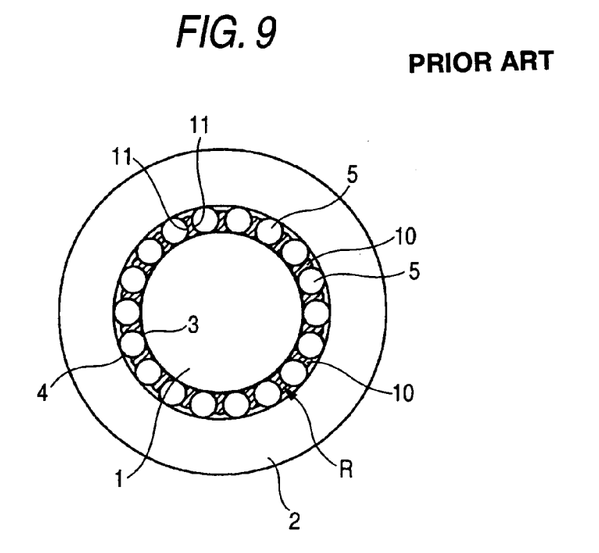
FIG. 9 is a cross sectional view of the ball screw apparatus shown in FIG. 8.

For example, the ball screw apparatus is, as shown in FIGS. 8 and 9, composed of a screw shaft 1 having a first spiral screw groove 3 on an outer circumferential face thereof, and a nut 2 having a second screw groove 4 on an inner circumferential face in opposition to the first screw groove 3 defined in the screw shaft 1 and being in mesh with the screw shaft 1 via a plurality of balls 5 rotatably charged in a spiral ball rolling path R defined between the first and second screw grooves 3, 4. The ball rolling path R is provided at its one end with a ball circulating path J for taking up the balls rolling and tracking in the ball rolling path R and sending to the other end. If relatively rotating the screw shaft 1 and the nut 2, and moving one of them in an axial direction, this ball screw apparatus endlessly performs relatively spiral movement between the screw shaft 1 and the nut 2 through rolling of the plural balls 5.

In the ball screw apparatus of such a structure, the ball rolling path R has a face of, for example, Gothic arch, and the ball 5 rolls under an angular contact with the R-face of the ball rolling path at two to four points, while the ball rolling path R spirally continues and by having a return mechanism of the ball circulating path J, change from a non-loaded condition to a loaded condition happens. Since the ball 5 under the loaded condition (called as "loaded ball" hereafter) does not form an ideal rolling condition but creates a spin phenomenon, the ball is easy to cause slip and a ball abrasion occurs. Further, since the adjacent loaded balls 5 contact under a condition of rolling in opposite directions each other, slip is caused between the loaded balls 5. As a result, the loaded balls 5 are prevented from free rolling, and there arise various problems of bad working of the loaded balls 5, creation of abrasion and damage, fluctuation of torque, or occurrence of noises.

Particularly, in the ball screw apparatus effected on and off with high load applied to an injection molding machine or pressing operation, since osculating ellipse is large owing to elastic deformation between the ball 5 and the ball rolling path R, abrasion of the loaded ball is large by spin, and competition of the ball 5 particular to the ball screw apparatus occurs, so that the abrasion and damage appear more remarkably.

For solving these problems, as shown in FIG. 9, such a measure has been broadly practiced where the retaining pieces 10 having recesses 11 at both ends in the ball tracking direction are interposed between the adjacent balls 5 rolling and tracking in the ball rolling path R, and this measure enables to suppresses competition of the balls 5.

However, by interposing the retaining pieces 10, a new problem arises that the retaining piece 10 and the ball 5 compete against each other, so that the retaining pieces 10 are effected with abrasion and damage. Abrasion and damage of the retaining piece 10 create spaces around the retaining piece 10, and a sum total in spaces of the retaining pieces 10 and the balls 5 at an initial period (when setting the retaining piece 10 to the ball screw apparatus) inconveniently grow while using the ball screw apparatus.

Further, if the retaining piece 10 is formed with a resin, depending on sorts of resins (for example, Nylon based resins enabling mass-production by an injection molding at low cost), an expansion phenomenon occurs which absorbs water content and varies dimensions, so that contact points of the adjacent balls 5 are made near inconveniently. As a result, spaces are created around the respective retaining pieces 10, and therefore the sum total of the spaces between the retaining pieces 10 and the balls 5 is larger than that of an early condition.

Figure 10:
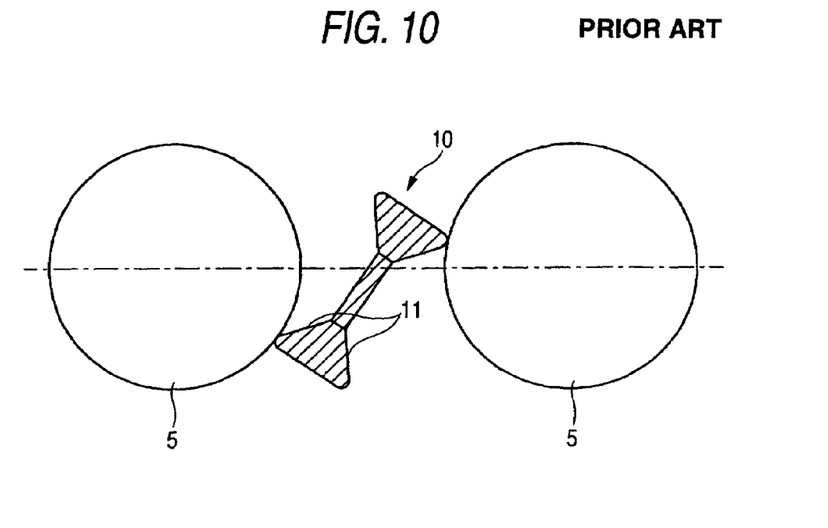
FIG. 10 is a cross sectional view showing the retaining piece falling down in the ball screw apparatus of FIG. 9.

Herein, when the sum total in spaces of the retaining pieces 10 and the balls 5 increases and the spaces gather to one position, the retaining piece 10 falls as shown in FIG. 10 to probably cause bad working or earlier damage of the ball screw apparatus.

Japanese Patent Laid Open 21018/2001 discloses therefore a measure of interposing elastic materials between the adjacent balls together with the retaining pieces. Depending on this measure, if the ball is effected with high load on and off, it is possible to suppress abrasion and damage acting on the retaining pieces and the balls.

Japanese Patent Laid Open 199556/2000 discloses a measure formed with ruggedness on contacting faces with the balls of the retaining pieces. According to this measure, the retaining pieces and the balls roll while point-contacting, thereby enabling to suppress abrasion and damage of both.

However, in the above Patent Laid Open 21018/2001, if the elastic material placed between the adjacent balls together with the retaining pieces is loaded, spring force of the elastic material acting on the loaded ball is powerless, and inconveniently a space adjusting capacity is not enough. Therefore, depending on space growth owing to abrasion and damage of the retaining piece and the loaded ball, or dimensional change of the retaining pieces by the expansion phenomenon, the retaining piece might fall, and there still remains a room for improvement of maintenance in the sum total of spaces between the retaining pieces and the balls or prevention from falling of the retaining pieces.

SUMMARY OF THE INVENTION

The above Japanese Patent Laid Open 199556/2000 adjusts spaces through the relation with a ball diameter, but as to spaces, attention should be essentially paid to falling of the retaining piece, and the maintenance must be based on a standard of dimension of the retaining piece. Thus, there yet leaves a room for improving the maintenance in the sum total of spaces between the retaining pieces and the balls or prevention from falling of the retaining pieces.

In view of the above mentioned circumstances, the invention has been realized, and especially with respect to the ball screw apparatus effected with high load on and off, and it is an object of the invention to provide a ball screw apparatus which suppresses abrasion and damage by competition of the balls, controls the spaces between the retaining pieces and the balls, and prevents the retaining piece from falling, thereby enabling to more improve operating ability.

SUMMARY OF THE INVENTION

For solving the problems, a ball screw apparatus according to the invention is concerned with a ball screw apparatus which has a screw shaft defined with a first spiral screw groove on an outer circumferential face thereof, a nut having a second screw groove on an inner circumferential face in opposition to the first screw groove defined in the screw shaft and being in mesh with the screw shaft via a plurality of balls rotatably charged in a spiral ball rolling path defined between the first and second screw grooves, and retaining pieces interposed between the adjacent balls and having recess portions at both edges in ball tracking directions, characterized in that contact angle θ between the ball and the retaining piece is defined to be 25° or above to 40° or below.

Herein, the contact angle θ between the ball and the retaining piece referred to in the invention designates ½ angle of an angle defined by a central line of the ball and two straight lines connecting two contacting points of the ball and the retaining piece.

A second ball screw apparatus according to the first invention is characterized in that a sum total of spaces between the balls and the retaining pieces is 50% or less of the height of the retaining piece.

The space referred to in the invention designates, in the retaining pieces, a minimum distance between a position of the front end of the ball contacting the recessed faces of the retaining piece formed in both ends in the ball tracking direction and a position of the front end of the ball separating from the recessed faces of the retaining piece. The height of the retaining piece designates herein a length size of the retaining piece vertical with respect to a ball tracking direction, and in case the retaining piece is cylindrical or columnar, the height is meant by a size of an outer diameter, and in case the retaining piece is polygonal, it is meant by a size of polygonal circumscribed circle diameter,

DETAILED DESCRIPTION OF THE PREFERRED EMBODIMENTS

Explanation will be made as follows to one embodiment of the invention, referring to the attached drawings.

Figure 1:
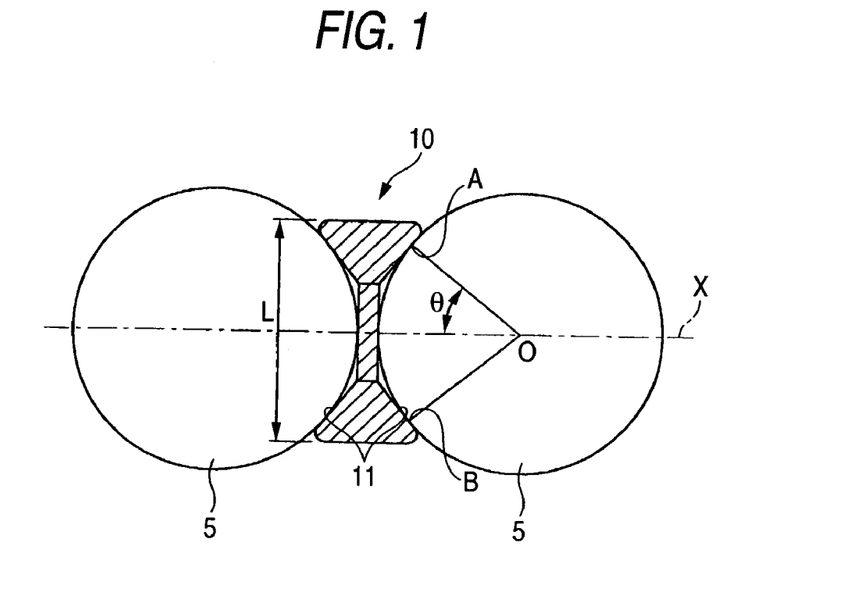
FIG. 1 is a cross sectional view showing one structural example of the ball screw apparatus according to the invention.
Figure 2:
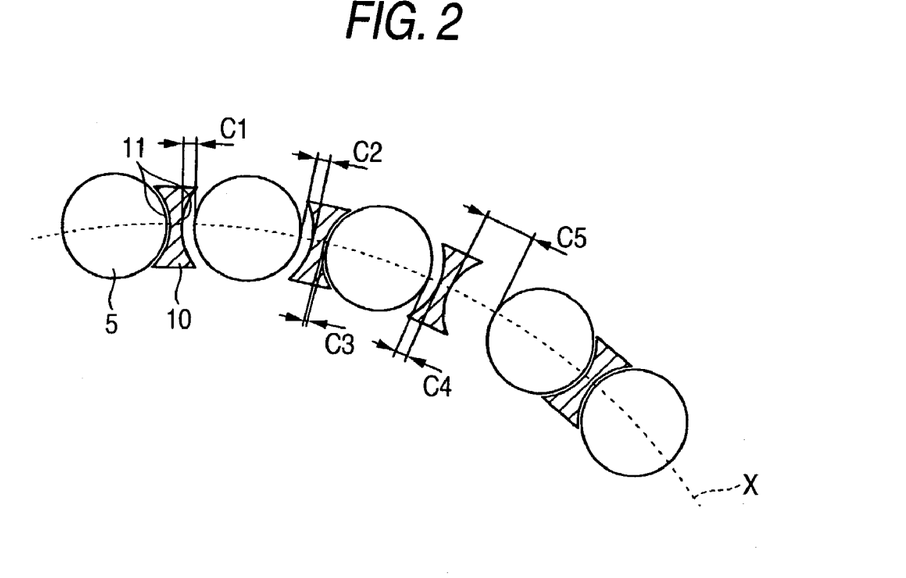
FIG. 2 is a cross sectional view showing the ball screw apparatus according to the invention, explaining spaces between the balls and the retaining pieces.
Figure 3A:
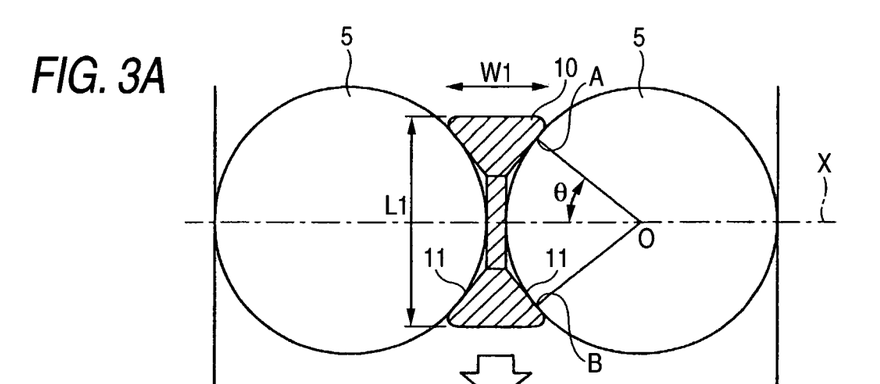
FIGS. 3A and 3B are cross sectional views showing the ball screw apparatus according to the invention, showing changes in sizes by expansion phenomenon of the retaining pieces.
Figure 3B:
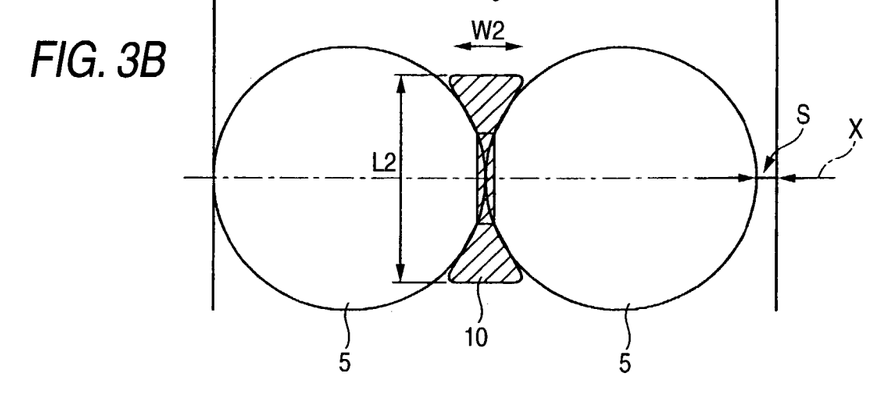

FIG. 1 is a cross sectional view showing one structural example of the ball screw apparatus according to the invention. FIG. 2 is cross sectional views showing the ball screw apparatus according to the invention and explaining the spaces between the balls and the retaining pieces. FIGS. 3A and 3B are cross sectional views of the ball screw apparatus of the invention showing dimensional change owing to the expansion phenomenon of the retaining pieces. By the way, since the ball screw apparatus in this embodiment is different only in the retaining piece 10 placed between the adjacent balls 5 in the ball rolling path R with respect to the conventional ball screw apparatus shown in FIGS. 8 and 9, only different points will be explained.

In the ball screw apparatus of this embodiment, the retaining piece 10 is shaped in short cylinder with, for example, Nylon 2020 (made by Ube Industries, Ltd.), and as shown in FIG. 1, is formed with recesses 11 having a conical shape at both ends in a ball tracking direction X (lateral directions in FIG. 1).

The retaining piece 10 is positioned between the balls 5 running in the ball rolling path R such that a contact angle θ between the ball and the retaining piece is defined to be 25° or above to 40° or below. Herein, the contact angle θ between the ball 5 and the retaining piece 10 designates ½ angle of an angle defined by a central point O of the ball 5 and two straight lines OA, OB connecting two contacting points A, B of the ball 5 and the retaining piece 10.

Under an initial condition of installing the retaining pieces 10 to the balls 5, as shown in FIG. 2, the sum total Σ (=C1+C2+ . . . C5+ . . . ) of the spaces C between the retaining pieces 10 and the balls 5 is determined to be 50% or less of the height size of the retaining piece 10. Herein, the height of the retaining piece 10 designates, in FIG. 1, a length size of the retaining piece 10 in a direction vertical (vertical direction in FIG. 1) with respect to the tracking direction X of the ball 5, and in this embodiment, it is an outer diameter L of the retaining piece 10.

Next, results where effects of the ball screw apparatus of the invention having the above mentioned structure were confirmed by a life test are shown in FIGS. 4 to 7. As to the life test, by use of an endurance life testing machine (made by Nihon Seiko Kabushiki Kaisha), a life is determined until a working torque becomes more than two times of a starting state under conditions where the retaining pieces 10 fall, or the balls 5 and the retaining pieces 10 push one another and are caught by entrance-exit or seams of ball circulating path J. The testing time was thus recorded. Of 10 test pieces, times when the ball screw apparatus reached the life of 10% were obtained from the sides of short lives by Weibull function distributions, and those were taken as test lives. The tests were carried out under a heavy load condition usually used in the injection molding machine, and lives of calculation under the testing condition (called as "calculation life" hereafter) were demanded, and the tested results were shown with ratio of the calculation life time vs. testing time. The tests were closed at values of 10 times of the calculation life.

The basic testing conditions of the present life test are shown under.

(Basic Testing Conditions)

Bearing number: Ball screw 25×10×500–C5 (ball diameter 3/16 in. made by Nihon Seiko Kabushiki Kaisha)
Testing load: Axial load=5800N (P/C=0.5)
Maximum rotation number: 100 to 200 rpm
Stroke: 60 mm
Circulatory grease: Albania No. 2 (made by Showa Shell Oil)
Atmospheric moisture: 60 to 70%
Atmospheric temperature: 60 to 80° C.

TEST EXAMPLE 1

In addition to the above basic testing conditions, the sum total Σ of the spaces C between the retaining pieces 10 and the balls 5 was taken as a maximum sum total Σ assumed as enabling to hold the retaining piece 10 between the balls 5 and was in advance determined 50% of an outer diameter size L of the retaining piece 10, and the life test was carried out by changing the contact angle θ between the retaining pieces 10 and the balls 5. Results are shown in Table 1 and FIG. 4.

TABLE 1

|  |  | Contact angles (°) of retaining pieces and balls | Ratios of lives under test condition (1) |
|---|---|---|---|
| Ex. | 1 | 25.0 | 10 |
|  | 2 | 27.8 | 10 |
|  | 3 | 30.0 | 10 |
|  | 4 | 32.3 | 10 |
|  | 5 | 34.2 | 10 |
|  | 6 | 36.0 | 10 |
|  | 7 | 37.6 | 10 |
|  | 8 | 38.7 | 9.2 |
|  | 9 | 40.0 | 7.2 |
| Com. Ex. | 10 | 21.0 | 10 |
|  | 11 | 23.0 | 10 |
|  | 12 | 41.8 | 1.3 |
|  | 13 | 43.2 | 0.8 |
|  | 14 | 44.6 | 0.4 |

Ex.: Examples
Com. Ex.: Comparative Examples

Figure 4:
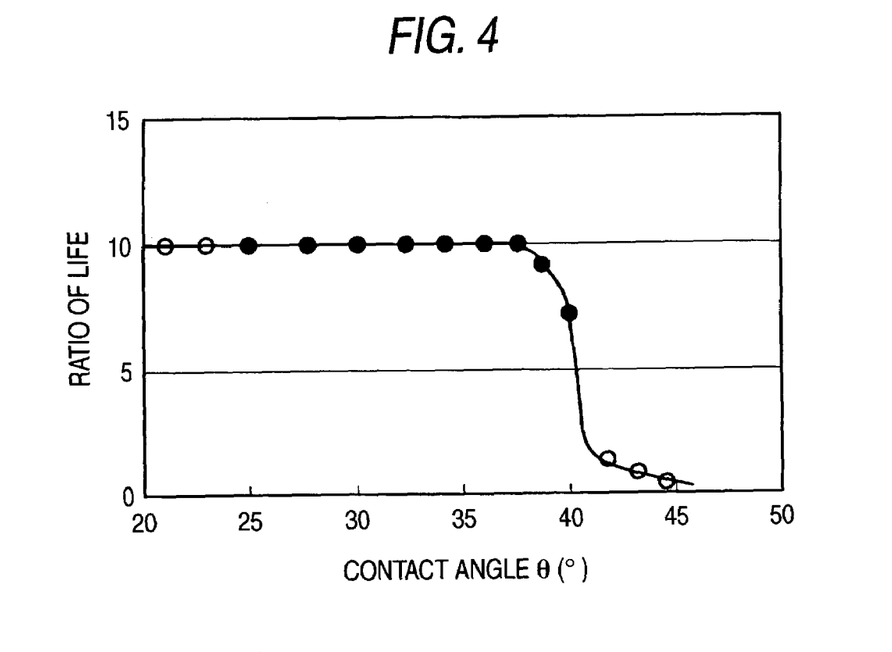
FIG. 4 is a view showing the relationship between the contact angle θ of the ball—the retaining piece and the life of the ball screw apparatus in the ball screw apparatus of the invention setting the sum total of the spaces between the balls and the retaining pieces to be 50% of the outer diameter size of the retaining piece.
Figure 5:
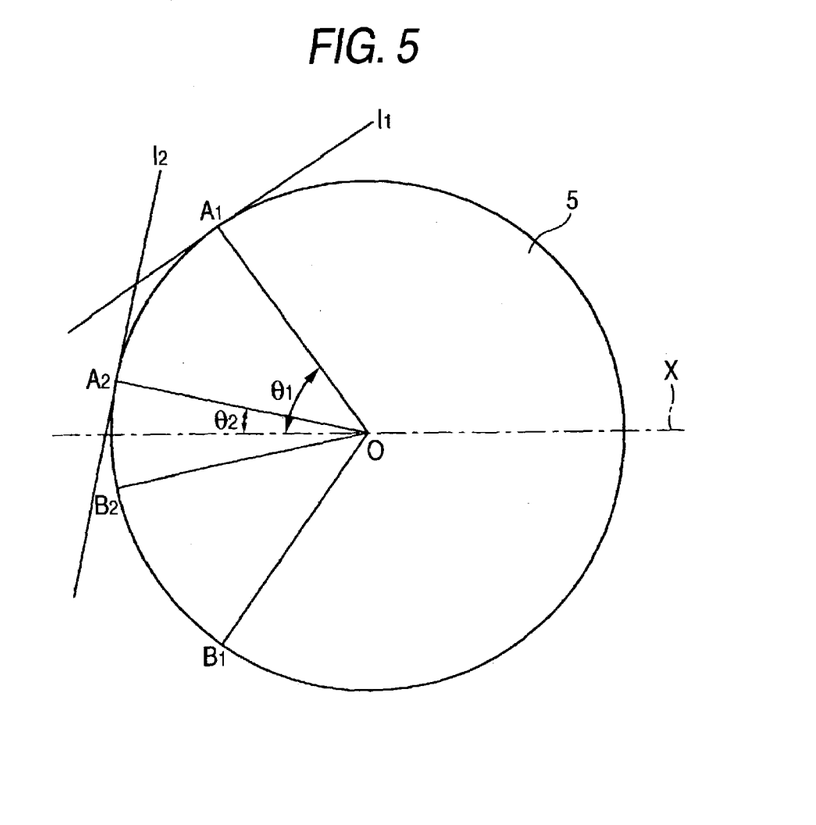
FIG. 5 is a view showing a tangent line between the ball and the retaining piece when changing the contact angle θ between both in the ball screw apparatus of the invention.

As shown in Table 1 and FIG. 4, it is seen that when total Σ of the spaces C between the retaining pieces 10 and the balls 5 at the initial state (when installing the retaining piece 10 between the balls 5) is set at 50% of the outer diameter size L of the retaining pieces 10, if the contact angle θ of the retaining piece 10 and the ball 5 is above 40°, the life considerably goes down. This fact is assumed that if the contact angle θ is above 40°, since as the contact angle $θ_1$ of FIG. 5, shows, a tangent line $l_1$ passing the contact point $A_1$ the retaining piece 10 and the ball 5 moves in ion where the tangent line $l_1$ is substantially horizontal with respect to the ball tracking direction X, and when, as FIG. 3 shows, the outer diameter size L of the retaining piece 10 expands from L1 to L2 owing to the expansion phenomenon, the space S created around the retaining piece 10 tends to grow. It is accordingly possible to realize a long life by defining the contact angle θ to be 40° or below, and further the contact angle θ is preferably defined to be 37.6° or below for enabling to certainly suppressing the increase of torque owing to the fall of the retaining piece 10.

TEST EXAMPLE 2

In addition to the above basic testing conditions, the sum total Σ of the spaces C between the retaining pieces 10 and the balls 5 was taken zero (0) as an assumed minimum sum total Σ, and the life test was carried out by changing the contact angle θ between the retaining pieces 10 and the balls 5. Results are shown in Table 2 and FIG. 6.

TABLE 2

|  |  | Contact angles (°) of retaining pieces and balls | Ratios of lives under test condition (2) |
|---|---|---|---|
| Ex. | 1 | 25.0 | 6.8 |
|  | 2 | 27.8 | 9.2 |
|  | 3 | 30.0 | 10 |
|  | 4 | 32.3 | 10 |
|  | 5 | 34.2 | 10 |
|  | 6 | 36.0 | 10 |
|  | 7 | 37.6 | 10 |
|  | 8 | 38.7 | 10 |
|  | 9 | 40.0 | 10 |
| Com. Ex. | 10 | 21.0 | 1.5 |
|  | 11 | 23.0 | 2.3 |
|  | 12 | 41.8 | 10 |
|  | 13 | 43.2 | 10 |
|  | 14 | 44.6 | 10 |

Ex.: Examples
Com. Ex.: Comparative Examples

Figure 6:
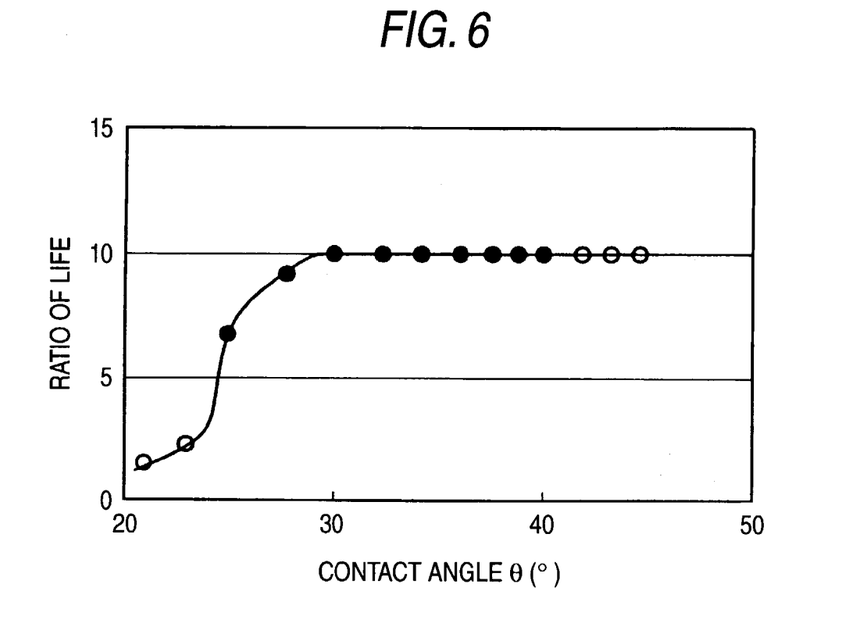
FIG. 6 is a view showing the relationship between the contact angle θ of the ball-the retaining piece and the life of the ball screw apparatus in the ball screw apparatus of the invention setting the sum total of the spaces between the balls and the retaining pieces to be zero (0)

As shown in Table 2 and FIG. 6, it is seen that when the sum total Σ of the spaces C between the retaining pieces 10 and the balls 5 at the initial state (when installing the retaining piece 10 between the balls 5) is set at zero (0), if the contact angle θ is above 25°, the life considerably goes down. This fact is assumed that if the contact angle θ is less than 25°, since, as the contact angle $θ_2$ of FIG. 5 shows, a tangent line $l_2$ passing the contact point $A_2$ between the retaining piece 10 and the ball 5 moves in a direction where the tangent line $l_1$ is vertical with respect to the ball tracking direction X, and when, as FIG. 3 shows, the width size L of the retaining piece 10 sensitively reacts to expansion from W1 to W2, so that the space S between the retaining piece 10 and the ball 5 is clogged. It is accordingly possible to realize a long life by defining the contact angle θ to be 25° or above, and further the contact angle θ is preferably defined to be 30° or above for enabling to certainly suppressing the increase of torque owing to pushing between the retaining pieces 10 and the balls 5.

TEST EXAMPLE 3

Figure 7:
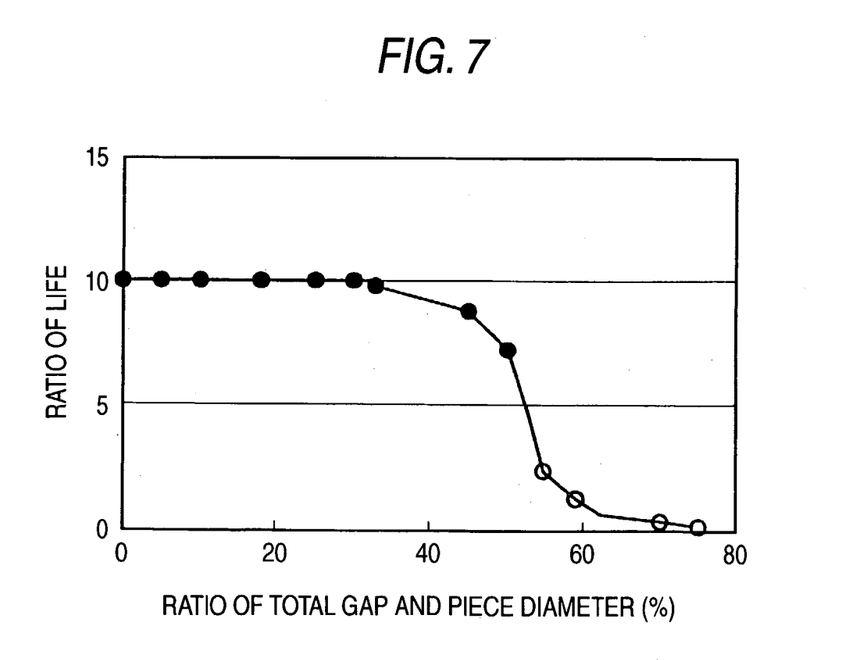
FIG. 7 is a view showing the relationship between the rate of the sum total of the spaces of the ball—the retaining piece and the outer diameter size of the retaining piece and the life of the ball screw apparatus in the ball screw apparatus of the invention setting the contact angle θ of the ball—the retaining piece to be 4°.

In addition to the above basic testing conditions, the contact angle θ is set at 40°, and the life test was carried out by changing the sum total Σ of the spaces C between the retaining pieces 10 and the balls 5. The Results are shown in Table 3 and FIG. 7. Herein, assuming that the rate of the sum total Σ of the spaces C between the retaining pieces 10 and the balls 5 vs. the outer diameter L1 of the retaining piece 10 is ΣL, it is shown in the following formula.

$$ΣL = Σ/L1 \times 100 (\%)$$

TABLE 3

|  |  | Rates (%) between sum total Σ of spaces and outer diameters of retaining pieces | Ratios of lives under test condition (3) |
|---|---|---|---|
| Ex. | 1 | 50 | 7.2 |
|  | 2 | 45 | 8.8 |
|  | 3 | 33 | 9.8 |
|  | 4 | 30 | 10 |
|  | 5 | 25 | 10 |
|  | 6 | 18 | 10 |
|  | 7 | 10 | 10 |
|  | 8 | 0 | 10 |
|  | 9 | 5 | 10 |
| Com. Ex. | 10 | 55 | 2.3 |
|  | 11 | 59 | 1.2 |
|  | 12 | 70 | 0.3 |
|  | 13 | 75 | 0.1 |

Ex.: Examples
Com. Ex.: Comparative Example

As shown in Table 3 and FIG. 7, it is seen that if the rate ΣL of the sum total Σ of the spaces C between the retaining pieces 10 and the balls 5 vs. the outer diameter size L of the retaining piece 10, exceeds 50%, the life goes down. It is accordingly possible to realize a long life by defining to be 50% or less the rate ΣL of the sum total Σ of the spaces C between the retaining pieces 10 and the balls 5 vs. the outer diameter L of the retaining piece 10, and further desirably ΣL is to be 30% or less for enabling to certainly suppressing the increase of torque owing to the fall of the retaining piece 10.

As seeing from the above test examples 1 to 3, if the sum total Σ of the spaces C between the retaining pieces 10 and the balls 5 is set 50% or less of the outer diameter size of the retaining piece 10, while the retaining pieces 10 are positioned between the adjacent balls 5 such that the contact angle θ with the ball 5 is 25° or above to 40° or below, preferably 30° or above to 37.6°, it is possible to suppress the torque increasing by pushing between the retaining pieces 10 and the balls 5 and suppress the sum total Σ of the spaces C between the retaining pieces 10 and the balls 5, though there happens the expansion phenomenon resulted by a material of the retaining piece 10. That is, such a ball screw apparatus can be offered which enables to secure stable working ability by suppressing abrasion and damage by competition of the balls 5 and falling of the retaining piece 10.

In the embodiment, the recess 11 of the retaining piece 10 is shaped in conical form, but not limited thereto, and a Gothic arch shape or polygonal shape will do. Further, the recess 11 may have a surface rugged with holes, dimples or grooves, or smooth with a surface roughness Ra being 50 μm, and by making the surface rugged, a lubricant is advantageously easy to kept.

Further, the embodiment uses the cylindrical retaining pieces 10, but not limited thereto, the retaining piece may have other shapes as polygonal.

The mechanism of the ball screw apparatus according to the invention can be applied to any linear-motion apparatus such as the ball spline apparatus, linear guide apparatus, or linear ball bush apparatus.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

EFFECTS OF THE INVENTION

As mentioned above, according to the ball screw apparatus of the invention, it is possible to suppress abrasion and damage caused by competition of the balls, and the retaining pieces from falling down, so that stable working ability can be secured.

What is claimed is:

1. A ball screw apparatus comprising:
a screw shaft having a first spiral screw groove on an outer circumferential face thereof;
a nut having a second screw groove on an inner circumferential face in opposition to the first screw groove defined in the screw shaft and being in mesh with the screw shaft via a plurality of balls rotatably charged in a spiral ball rolling path defined between the first and second screw grooves; and
a plurality of retaining pieces respectively interposed between the adjacent balls and having recess portions at both edges in ball tracking directions,
wherein a contact angle θ between each of the retaining pieces and the respective balls is in the range from 30° to 37.6°, and
wherein a sum total of spaces created between the balls and the retaining pieces is defined to be 30% or less of the height size of the retaining piece;
wherein the sum total of spaces created between the balls and the retaining pieces is defined to be 5% or more of the height size of the retaining piece.

* * * * *